Figure 1:
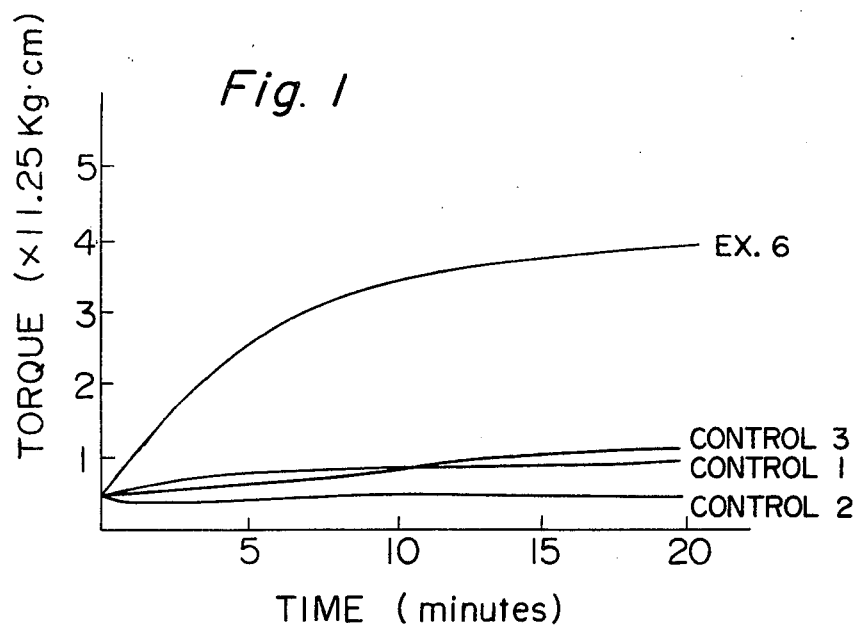

United States Patent [19]

Nakata et al.

[11] 4,069,174

[45] Jan. 17, 1978

[54] CURED OR UNCURED COMPOSITIONS OF HOMO- OR COPOLYMERS OF EPIHALOHYDRINS

[75] Inventors: Tetsuya Nakata, Ibaragi; Sachio Shimogawa, Amagasaki; Akira Hashimoto, Itami; Nobuo Yamada, Amagasaki, all of Japan

[73] Assignee: Osaka Soda Co. Ltd., Osaka, Japan

[21] Appl. No.: 550,998

[22] Filed: Feb. 19, 1975

[30] Foreign Application Priority Data

Feb. 20, 1974  Japan ................................. 49-20138

[51] Int. Cl.$^2$ .............................................. C08G 65/32
[52] U.S. Cl. ................... 260/2 A; 260/18 EP; 260/29.1 R; 260/30.6 R; 260/31.2 R; 260/33.2 EP; 260/37 EP; 260/45.7 P; 260/45.85 T; 260/47 A; 260/78.41; 260/830 TW; 260/878 R; 260/890; 260/899; 260/901; 526/11.2
[58] Field of Search .......... 260/2 A, 78.4 EP, 78.4 D, 260/1.8 EP, 29.1 R, 30.6 R, 31.2 R, 33.2 EP, 37 EP, 47 A, 45.7 P, 45.85 T; 526/11.2

[56] References Cited

U.S. PATENT DOCUMENTS

| 3,026,270 | 3/1962 | Robinson ............................... 260/2 |
| 3,341,491 | 9/1967 | Robinson et al. ................. 260/45.75 |
| 3,414,529 | 12/1968 | Green et al. ............................ 260/2 |
| 3,726,841 | 4/1973 | Mirolli et al. .......................... 260/79 |
| 3,790,506 | 2/1974 | Tillson ................................. 260/2 A |
| 3,790,524 | 2/1974 | Saito et al. ....................... 260/45.8 N |
| 3,875,122 | 4/1975 | Mirolli ........................... 260/78.4 D |

*Primary Examiner*—Harold D. Anderson
*Assistant Examiner*—E. A. Nielsen
*Attorney, Agent, or Firm*—Sherman & Shalloway

[57] ABSTRACT

A cured or uncured composition of homo- or copolymer of epihalohydrins comprising a homo- or copolymer of an epihalohydrin, curable amounts of a curing agent therefor and an acid acceptor, characterized in that said curing agent and acid acceptor consist, on the basis of 100 parts by weight of said homo- or copolymer of epihalohydrin, of (a) 0.1 – 10 parts by weight of a cyclic carboxylic acid anhydride, (b) 0.1 – 10 parts by weight of a compound selected from the group consisting of 1,8-diazabicyclo(5,4,0)undecene-7 and salts thereof, and (c) 0.5 – 20 parts by weight of a metal compound selected from the group consisting of the oxides of the metals of group II of the periodic table of elements, hydroxides of said group II metals, carbonates of said group II metals, carboxylic acid salts of said group II metals, oxides of the metals of group IV*a* of the periodic table of elements, basic carbonates of said group IV*a* metals, basic carboxylic acid salts of said group IV*a* metals and basic phosphites of said group IV*a* metals.

28 Claims, 4 Drawing Figures

CURED OR UNCURED COMPOSITIONS OF HOMO- OR COPOLYMERS OF EPIHALOHYDRINS

This invention relates to cured or uncured compositions of homo- or copolymers of epihalohydrins, the properties of which have been greatly improved. More particularly, the invention relates to cured or uncured composition of homo- or copolymers of epihalohydrins which demonstrate such improved properties as the following: superior storage stability of the uncured composition; satisfactory vulcanizing speed when curing the uncured composition; outstanding performance with respect to their property of preventing contamination and corrosion that occur in the mold and other metallic vessels used in the curing operation; excellent resistance to heat-aging, satisfactory compression set and other excellent properties of the cured composition, as well as superior performance in preventing corrosion when the cured composition is used in contact with metals.

Some homo- or copolymers of epihalohydrins (hereinafter abbreviated, at times, to epihalohydrin polymers), after being cured (vulcanized, i.e., cross-linked), are used commercially as a rubber material possessing desirable heat resistance and resistance to oils as well as various other unique properties. Various new proposals have been made in connection with the ways of curing epihalohydrin polymers when they are used. The cross-linking of epihalohydrin polymer is said to be the result of the reaction of the side chain halogen contained in the molecule of the polymer. As an example of a typical curing method, that of U.S. Pat. No. 3,026,305 can be mentioned. It is suggested in this patent to accomplish the cure by reacting either sulfur or a certain class of organic sulfur compounds, e.g., tetramethylthiuram disulfide or 2-mercaptobenzothiazole, with the epihalohydrin polymer in the presence of certain amines, e.g., such as tri-n-butylamine, triethanolamine and dicyclohexylamine. In another method of curing, a combination consisting of either 2-mercaptoimidazoline or 2-mercaptopyridine and specific metal compound, e.g., red lead, magnesia, white lead or dibasic lead phosphite is used (U.S. Pat. No. 3,341,491). In still another curing method, certain polyamines or salts thereof, e.g., ethylenediamine, or hexamethylenediamine carbamate, are used as the curing agent (U.S. Pat. No. 3,026,270). Mercaptotriazine derivatives, e.g., 1-dibutylamino-3,5-dimercaptotriazine, have also been used as the curing agent (Japanese Patent Publication No. 36926/73).

Notwithstanding these various prior art suggestion concerning the curing epihalohydrin polymers, a curing method and a composition therefor which conjointly possess such properties as satisfactory storage stability and vulcanization speed, as well as superior performance in preventing corrosion on metals, satisfactory heat resistance and compression set are still unavailable. This is the present state of the art. As a consequence, the utilization of epihalohydrin polymer, which possesses excellent properties as a rubber material, is severely limited. Hence, the development of a cured or uncured composition of homo- or copolymer of epihalohydrins possessing the foregoing properties to a satisfactory extent is much needed.

As a result of our research to provide a cured or uncured composition of homo- or copolymer of epihalohydrins which could satisfy the above-mentioned requirements we have that satisfactory results could be obtained by utilizing as the curing agent for eiphalohydrin polymer one which has not been suggested at all heretofore, viz, a combination consisting of a compound selected from the group consisting of 1,8-diazabicyclo(5,4,0)undecene-7 (hereinafter abbreviated to DBU at times) and salts thereof, a cyclic carboxylic acid anhydride, and as an acid acceptor a specific metal compound. Although the aforesaid DBU has been used in one instance as one of the components of a curing agent of the epoxy resin in the past, that it would demonstrate an outstanding performance in curing the epihalohydrin polymer of an entirely different cross-linking structure when used under the combined conditions indicated above was a complete surprise. Further, there was no information at all by which it could be foreseen that the various outstanding effects would be conjointly provided by the present combination when used for curing the epihalohydrin polymer not possessing an epoxy group but said to be cross-linked by the side chain halogen.

It is therefore an object of the present invention to provide a cured or uncured composition of homo- or copolymer of epihalohydrins possessing the various outstanding properties mentioned hereinbefore, which were not possible to achieve by conventional methods.

Other objects and advantages of the invention will become apparent from the following description.

According to this invention, in a cured or uncured composition of homo- or copolymer of epihalohydrins comprising a mono- or copolymer of an epihalohydrin, a curable amount of a curing agent therefor and an acid acceptor, which composition, if desired, may also contain as additives fillers, reinforcing agents, plasticizers, lubricants, tackifiers, stabilizers, antioxidants, blowing agents, flame retardants, pigments and others, there is provided a composition in which the curing agent and acid acceptor consist on the basis of 100 parts by weight of said homo- or copolymer of an epihalohydrin of a. about 0.1 – about 10 parts by weight, and preferably about 0.5 – about 5 parts by weight, of a cyclic carboxylic acid anhydride, b. about 0.1 – about 10 parts by weight, and preferably about 0.5 – about 5 parts by weight, of a compound selected from the group consisting of 1,8-diazabicyclo (5,4,0) undecene-7 and salts thereof, and c. about 0.5 – about 20 parts by weight, and preferably about 1 – about 10 parts by weight, of a metal compound selected from the group consisting of an oxide of a metal of group II of the periodic table of elements, a hydroxide of said group II metal, a carbonate of said group II metal, a carboxylic acid salt of said group II metal, an oxide of a metal of group IVa, a basic carbonate of said group IVa metal, a basic carboxylic acid salt of said group IVa metal and a basic phosphite of said group IVa metal.

The homo- or copolymer of an epihalohydrin of this invention does not possess an epoxy group in its molecules but possess a halo-methyl group as a functional group. Specific examples of these epihalohydrin polymers include such homopolymers as polyepichlorohydrin and polyepibromohydrin, as well as epihalohydrin copolymers. Examples of the copolymers include epichlorohydrin-epibromohydrin copolymer and the copolymers of an epihalohydrin with at least one comonomer selected from the group consisting of epoxide compounds and dicarboxylic acid anhydrides. Examples of the epoxides in this case include copolymerizable epoxides such as ethylene oxide, propylene oxide, butylene oxide, styrene oxide, phenylglycidyl ether, allylglycidyl ether and glycidyl methacrylate. On the other hand, examples of dicarboxylic acid anhydrides, include 5-membered dicarboxylic acid anhydrides such as succinic anhydride, phthalic anhydride, itaconic anhydride, hexahydrophthalic anhydride and tetrahydrophthalic anydride. Not only can a single class of these comonomers be used, but also a plurality thereof may be used in a suitable combination.

It is desirable to use the copolymer derived from the foregoing epihalohydrin and a comonomer selected from the foregoing group which consists of at least about 5 mol%, preferably at least about 10 mol%, more preferably at least about 20 mol%, and still more preferably at least about 40 mol%, of epihalohydrin, while the remainder is the foregoing comonomer. Specific examples of the copolymers derived from these epihalohydrins and comonomers other than epihalohydrins include epichlorohydrin or epibromohydrin-ethylene oxide copolymer, epichlorohydrin or epibromohydrin-propylene oxide copolymer, epichlorohydrin or epibromohydrin-allylglycidyl ether copolymer, epichlorohydrin or epibromohydrin-ethylene oxide-allylglycidyl ether copolymer, epichlorohydrin or epibromohydrin-propylene oxide-allylglycidyl ether copolymer, epichlorohydrin or epibromohydrin-succinic anhydride copolymer, epichlorohydrin or epibromohydrin-ethylene oxide-succinic anhydride copolymer, epichlorohydrin or epibromohydrin-propylene oxide-succinic anhydride copolymer and epichlorohydrin or epibromohydrin-ethylene oxide-propylene oxide copolymer.

The cyclic carboxylic acid anhydride (a) to be used in the invention composition in an amount of about 0.1 - 10 parts by weight per 100 parts by weight of the epihalohydrin polymer, as described above, is perferably a cyclic carboxylic acid anhydride having in its molecules a ring structure represented by one of the following formulae (i) - (iv), particularly preferred being that having a 5-membered ring structure of formulae (i) - (iii). Among these cyclic carboxylic acid anhydrides of formulae (i) - (iv), those whose molecular weight is about 100 - 400 are to be preferred.

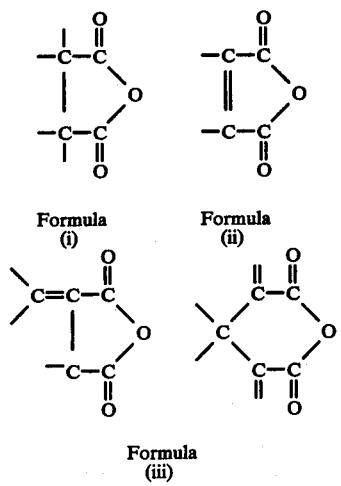

Examples of these cyclic carboxylc acid anhydrides include succinic anhydride, maleic anhydride, citraconic anhydride, itaconic anhydride, tetrahydrophthalic anhydride, methyltetrahydrophthalic anhydride, endomethylenetetrahydrophthalic anhydride, phthalic anhydride, hexahydrophthalic anhydride, trimellitic anhydride, pyromellitic anhydride, dodecenylsuccinic anhydride, as well as the succinic acid derivatives formed by the addition of maleic anhydride with an unsaturated compound such as rosins, olefins, furans and anthracene, and the addition polymers of maleic anhydride with a vinyl compound.

In the composition of this invention a compound selected from the group consisting of DBU and the salts thereof (b) is used in an amount ranging about 0.1 - about 10 parts by weight, and preferably about 0.5 - about 5 parts by weight, per 100 parts by weight of the epihalohydrin polymer such as hereinbefore described. DBU is a compound having the following formula

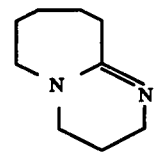

As shown in the above formula, while DBU has two nitrogen atoms in its molecule, it does not form a di-salt with the various classes of protonic acids and Lewis acids but forms only the mono-salts. That is, DBU behaves as a monovalent base, and in this respect it differs from the behavior of the diamines which have two nitrogen atoms in their molecule and behave as a divalent base. Further, whereas the diamine curing agents of the hereinbefore-described prior art U.S. Pat. No. 3,026,270 demonstrate a cross-linking activity even when they are used alone with the epihalohydrin polymer, DBU is a unique compound in this respect also, for it does not demonstrate any utilizable curing effect at all when it is used alone.

In the present invention the above-mentioned salts of DBU are used. Examples of these salts are those of DBU and a compound selected from the group consisting of phenol and its derivatives capable of forming a salt with DBU, carboxylic acids, carbonic acid and weakly acidic inorganic solid acids. It is presumed that these compounds in all probability mask the DBU and act similarly to DBU at the time of the heat-curing operation. These salts of DBU are preferred in view of easy management for the reasons that their vapor pressure is lower than DBU and that they are not strongly basic, and less basic than DBU. In addition, they are also preferred for the reason that they enhance the stability of the composition.

Among such phenol and the salt-forming derivatives thereof which form DBU salts, all those containing a benzene ring having a hydroxy substituent and capable of forming a salt with DBU are usable. Specific examples include such compounds as phenol, cresols, guaiacol, chlorophenols, nitrophenols, pyrogallol and bis-(4-hydroxyphenyl)-2-propane. On the other hand, suitable carboxylic acids that form a salt with DBU are all those which contain at least one carboxyl group in their molecule. Specific examples include such $C_2$-$C_{22}$ aliphatic carboxylic acids as acetic acid, propionic acid, butyric acid, caproic acid, caprylic acid, lauric acid, stearic acid, succinic acid, fumaric acid, adipic acid, glutaric acid, sebacic acid, tartaric acid, citric acid, diglycollic acid and thiodiglycollic acid; such $C_6$-$C_{20}$ alicyclic carboxylic acids as cyclohexanecarboxylic acid, tetrahydrophthalic acid and hexahydrophthalic acid; and such $C_7$–$C_{20}$ aromatic carboxylic acids as benzoic acid, toluic acids, phthalic acids, aminobenzoic acid and hydroxybenzoic acid. On the other hand, the above-mentioned inorganic solid acids are exemplified by such compounds as silicates, silica and hydrous silica.

Further, along with the hereinbefore-described cyclic carboxylic acid anhydride (a) and a compound selected from the group consisting of DBU and salts thereof (b), the aforementioned specific metal compound (c) is used in the present invention as an acid acceptor. The amount of metal compound used is about 0.5 – about 20 parts by weight, and preferably about 1 – about 10 parts by weight, per 100 parts by weight of epihalohydrin polymer.

As the metal compounds, the oxides, hydroxides, carbonates and carboxylic acid salts of the metals of group II of the periodic table of elements are used. Preferred are the compounds of the group II metals such as Mg, Ca, Zn, Sr, Cd and Ba, and especially the metal compounds of Mg, Ca, and Ba. Specific examples of these group II metal compounds include magnesium oxide (magnesia), calcium oxide (quicklime), calcium hydroxide (slaked lime), barium oxide, zinc oxide (zinc white), magnesium benzoate, calcium oleate, magnesium carbonate and calcium carbonate. On the other hand, as the oxides, basic carbonates, basic carboxylic acid salts and basic phosphites of the metals of group IV$a$, the compounds of group IV$a$ metals selected from the group consisting of Si, Ge, Sn, and Pb, and especially the metal compounds of Sn and Pb are preferred. Specific examples of these compounds include triplumbic tetroxide (red lead), lead monoxide (litharge), dibasic lead carbonate (white lead), dibasic lead phthalate, dibasic lead stearate and dibasic lead phosphite. These metal compounds, which are presumed to serve as acid acceptors, can be used either singly or as a mixture. Again, they may also be used in conjunction with other metal compounds that are known to be acid acceptors.

In addition other known additives can be incorporated into the composition of the present invention. Principal examples of these additives include, for example: reinforcing agents or fillers such as carbon black, white carbon, calcium carbonate, magnesium carbonate, barium sulfate, clay, diatomaceous earth and phenolic resins; softeners or plasticizers such as the esters of various carboxylic acids or phosphoric acid, polyethers and paraffinic or aromatic hydrocarbons; lubricants such as long chain aliphatic carboxylic acids or long chain aliphatic carboxylates; tackifiers such as alkylphenolformalin resins, cumarone resins, terpene resins and rosin; antioxidants such as phenol derivatives, amine derivatives, mercapto derivatives, dialkyldithiocarbamates and phosphorous acid esters; stabilizers such as organo-tin compounds and epoxy compounds; flame retardants such as antimony oxide and phosphoric acid esters; and pigments such as titanium dioxide. The amounts of these additives can be varied as desired. They are most frequently used per 100 parts by weight of epihalohydrin polymer in amounts of about 1–100 parts by weight for fillers, reinforcing agents, plasticizers, or softeners; 0.1 – 10 parts by weight for lubricants and tackifiers; and 0.1–10 parts by weight for antioxidants and stabilizers. Further, it is possible to further enhance the heat-aging resistance of the cured composition by incorporating in the invention composition in addition to the cyclic carboxylic acid anhydride the alkali metal salts of such acids as polycarboxylic acids (carboxylic acids containing at least two carboxyl groups in their molecule), orthophosphoric acid, phosphonic acids and cyanuric acid. These agents for improving the resistance to heat-aging of the cured composition are usually used in an amount of about 0.1 – about 5 parts by weight per 100 parts by weight of epihalohydrin polymer. Specific examples include alkali metal salts such as sodium succinate, potassium succinate, sodium adipate, potassium fumarate, potassium phthalate, sodium trimellitate, potassium sebacate, sodium citrate, potassium phosphate and potassium phosphonate.

In preparing the uncured composition of this invention, no particular restrictions as to the sequence in which the aforesaid components (a), (b), (c) and other additives are blended with the epihalohydrin polymer are imposed. Any sequence will do. Further, there are no particular restrictions imposed on the means and procedure employed. Any means and procedure may be used so long as a homogeneous composition can be obtained. For example, the blending means used may be open rolls, various types of blenders and mixers, and the procedure may consist of a single step or a plurality of steps.

If desired, the invention composition can be blended with a polymer other than the epihalohydrin polymers. These other polymers may be blended in an amount of preferably not more than about 50% by weight, more preferably not more than about 30% by weight, and most preferably not more than about 20% by weight, based on the epihalohydrin polymer. In this case it is best to blend these other polymers in such an amount that the amount of the units derived from the epihalohydrin polymers account for at least about 30%, and preferably at least about 50%, of the resinous constituents of the composition as a whole. As specific examples of these other polymers to be blended with the composition, included are polychloroprene, polyvinyl chloride, chlorinated polyethylene, acrylic esterchloroethylvinyl ether copolymer and epoxy resins.

The curing of the uncured composition of this invention can be accomplished by heating the composition. The heating temperature, which can be chosen suitably, is usually from about 120° to about 200° C. While the heating time is suitably chosen in accordance with, say, the temperature and the amount of the cross-linking agent used, the period most frequently used ranges from about 5 to about 60 minutes. The heat-curing need not be carried out in a single step but can be carried out in many stages. For instance, it is also possible to submit the composition to a postcure treatment for achieving a still greater improvement of the physical properties. The curing procedure can be suitably chosen, it being possible to use any of the conventional procedures including pressurized heat-molding by means of molds, or heating by means of a steam kettle, oil bath, sand bath, air bath, etc.

The following examples, along with control experiments, are given for more fully illustrating several modes of the invention composition and its properties.

EXAMPLES 1–9 AND CONTROLS 1–6

As the epihalohydrin polymer, an epichlorohydrin homo-polymer (CHR) and an epichlorohydrin-ethylene oxide copolymer (CHC) were each used, and uncured compositions of CHR and of CHC of the compositions shown in Table 1 were prepared. These uncured compositions were kneaded for 15 minutes on mixing rolls at 80° C. and formed into sheet form. The resulting uncured compositions were placed in molds and cured under pressure and heat to obtain cured compositions whose properties are shown in Table 1'. In Table 2 the numerical values represent parts by weight, and CHC is a copolymer derived from about 50 mol% of epichlorohydrin and about 50 mol% of ethylene oxide. In Table 1' the curing conditions of the composition, unless otherwise specified, were 30 minutes at 155° C. and 80 Kg/cm².

that of Example 6 but in which the cyclic carboxylic acid anhydride (tetrahydrophthalic anhydride) was not used (Control 1), a composition similar to that of Example 6 except that a typical aliphatic tertiary amine (tributylamine) was used instead of the DBU salt (phenol salt) Control 2) and a composition similar to that of Example 6 but in which hexamethylenediamine carbamate, an example of a typical conventional curing agent, was used (Control 3) were made, and the results are shown Table 1

| | Ex. 1 | Ex. 2 | Ex. 3 | Ex. 4 | Ex. 5 | Ex. 6 | Ex. 7 | Ex. 8 | Ex. 9 | Con. 1 | Con. 2 | Con. 3 | Con. 4 | Con. 5 | Con. 6 |
|---|---|---|---|---|---|---|---|---|---|---|---|---|---|---|---|
| CHR | 100 | 100 | 100 | | | | | | | | | | | 100 | |
| CHO | | | | 100 | 100 | 100 | 100 | 100 | 100 | 100 | 100 | 100 | 100 | | 100 |
| Dioctyl lead stearate | 1 | 1 | 1 | 1 | 1 | 1 | 1 | 1 | 1 | 1 | 1 | 1 | 1 | 1 | 1 |
| Carbon black | 40 | 40 | 40 | 40 | 40 | 40 | 40 | 40 | 40 | 40 | 40 | 40 | 40 | 40 | 40 |
| red lead | 5 | 5 | 5 | 5 | 5 | 5 | 5 | 5 | 5 | 5 | 5 | 5 | | 5 | 5 |
| white lead | | | | | | | | | | | | | 5 | | |
| DBU | 2 | | | 2 | | | | | | | | | | | |
| DBU-phenol salt | | 3 | 3 | | 3 | 3 | 3 | 3 | 3 | | | | | | |
| Succinic anhydride | | | | | | 3 | | | | | | | | | |
| Tetrahydrophthalic anhydride | 3 | 3 | | | | 3 | | | | | | 3 | 3 | | |
| Hexahydrophthalic anhydride | | | | | | | 3 | | | | | | | | |
| Itaconic anhydride | | | | | | | | 3 | | | | | | | |
| Dodecenyl succinic anhydride | | | | | | | | | 3 | | | | | | |
| allyl chloride-maleic anhydride copolymer[1] | | | 3 | | | | | | | | | | | | |
| Pyromellitic anhydride | | | | | | 3 | | | | | | | | | |
| Tributylamine | | | | | | | | | | | | 3 | | | |
| Hexamethylenediamine carbamate | | | | | | | | | | | | | 3 | 1 | |
| 2-Mercapto-imidazoline | | | | | | | | | | | | | | 1.5 | 1.5 |
| Nickel dibutyldithocarbamate | | | | | | | | | | | | | | 1 | 1 |

Note
[1]Alkyl chloride : maleic anhydride = 2.5 : 1 (mol ratio), number average molecular weight 850.

Table 1'

| | Ex. 1 | Ex. 2 | Ex. 3 | Ex. 4 | Ex. 5 | Ex. 6 | Ex. 7 | Ex. 8 | Ex. 9 | con 1 | Con. 2 | Con. 3 | Con. 4 | Con. 5 | Con. 6 |
|---|---|---|---|---|---|---|---|---|---|---|---|---|---|---|---|
| Modulus at 100%(Kg/cm²) | 45 | 35 | 8 | 16 | 21 | 38 | 28 | 18 | 23 | Vulcanized product not obtainable | — | 41 | 43 | 45 | |
| Modulus at 200%(Kg/cm²) | 88 | 75 | 28 | 45 | 42 | 74 | 62 | 46 | 57 | | 5 | 88 | 97 | 88 | |
| Tensil strength at break (Tb) (Kg/cm²) | 120 | 135 | 120 | 108 | 115 | 123 | 120 | 110 | 120 | | 54 | 116 | 136 | 125 | |
| Elongation at break(%) | 450 | 480 | 805 | 252 | 620 | 510 | 540 | 600 | 590 | | 900 | 260 | 330 | 385 | |
| Hardness (Shore A) | 74 | 73 | 65 | 69 | 70 | 72 | 71 | 70 | 70 | | 61 | 76 | 75 | 74 | |
| Lupke rebound (%)[2] | — | 15 | — | — | — | 42 | — | — | — | | | | 13 | 44 | |
| Compression set (%)[3] | — | 30 | — | — | — | 35 | — | — | — | | | | 44 | 45 | |
| Compression set (%)[4] | — | 17 | — | — | — | 19 | — | — | — | | | | 21 | 30 | |

The modulus, tensile strength and elongation at break were measured using TENSILON Model UTM-III manufactured by Toyo Baldwin Co., Ltd.
[2]Product cured for 45 minutes at 150° C.
[3]Value at 70 hours at 120° C.
[4]Value at 70 hours at 120° C of product cured for 30 minutes at 150° C. and thereafter postcured for 5 hours at 150° C.

In Examples 1–9 and Controls 1–6, as an example of the composition of the present invention, the product obtained in Example 6 was chosen for illustration, and its cross-linking curve is shown in FIG. 1. (The measurement of the cross-linking curves was made using a JSR-type curelastometer and with an angle of the amplitude of 3 deg.) By way of comparison, measurements of the cross-linking curves of a composition similar to together in FIG. 1. From FIG. 1, it can be seen that, as compared with the use of the conventional amines, the use of DBU in the present composition under the condition wherein the components (a), (b) and (c) are combined demonstrates an outstanding increase in the cross-linking speed. Again, it is seen that practical cross-linking effects cannot be obtained when the indispensable cyclic carboxylic acid anhydride (a) is omitted from the composition of this invention.

Figure 2:
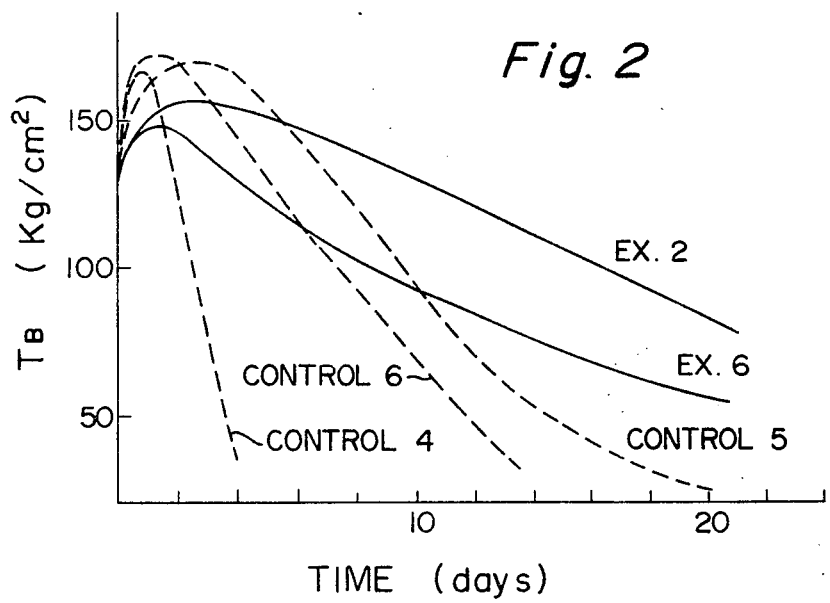
Figure 3:
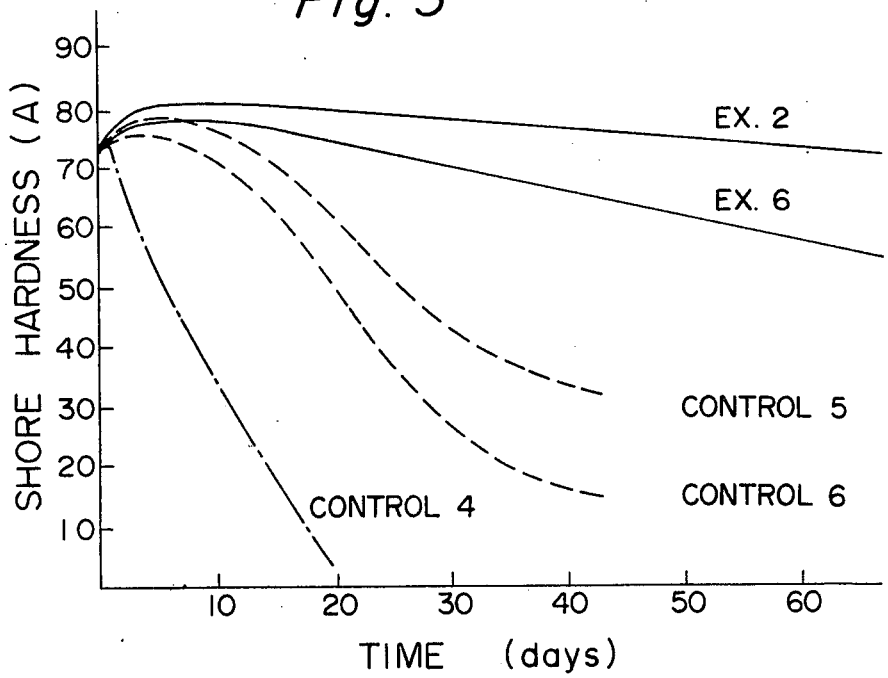

On the other hand, as an illustration of the heat-aging resistance of the present composition, FIG. 2 shows the relationship between tensile strength at break ($T_b$) and heating time under the condition of heating at 150° C. in the case of the cured compositions (curing conditions of 30 minutes at 155° C. and 80 kg/cm²) of Examples 2 and 6. Further, the relationship between heating time and hardness (Shore A) at this time is shown in FIG. 3. It can be seen from the results shown in FIGS. 2 and 3 that the composition of this invention possesses a marked superiority in its resistance to aging as compared with the cured compositions of epihalohydrin polymer that have been previously suggested.

EXAMPLES 10 – 16

Uncured compositions of the present invention having the compositions shown in Table 2 were prepared, using various salts of DBU. The preparation of the compositions were carried out by kneading the mixtures for 15 minutes at 80° C. and using mixing rolls to obtain the uncured compositions in sheet form. These compositions were placed in molds and heated for 30 minutes at 155° C. and 80 kg/cm² to obtain cured compositions. The physical properties of the so obtained compositions are shown in Table 2'. The numerical values used in Table 2 indicate parts by weight, while the measurements of the physical properties shown in Table 2' were carried out as in the case with Table 1'.

mation of pinholes could be noted in the mold surface with the naked eye. The numerical values presented in Table 3 indicate the number of such repetitions.

Table 3

| Uncured Composition | Number of Repetitions |
|---|---|
| Example 2 | >30 |
| Example 6 | >30 |
| Example 15 | >30 |
| Control 5 | 12 |
| Control 6 | 6 |

Figure 4:
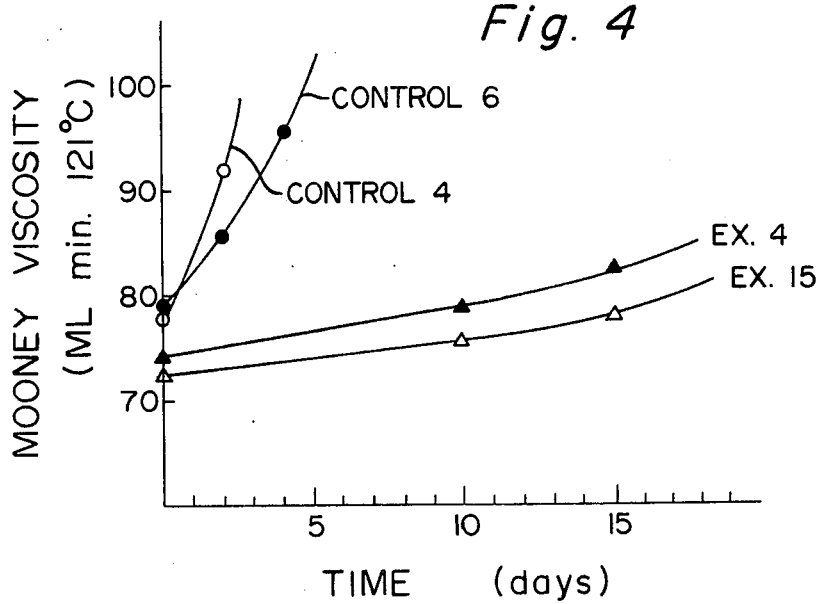

FIG. 4 is a graph showing the storage stabilities of the uncured compositions of the present invention as well as those of the compositions where typical cross-linking agents of the prior art have been used.

In the graph, the changes in the Mooney viscosities at 121° C. of the uncured compositions obtained in Examples 6 and 15 and Controls 4 and 6 when they were left standing in a constant temperature chamber of 40° C. are shown. As can be seen from the results FIG. 4, the uncured compositions of the present invention demonstrate excellent storage stabilities.

What we claim:

1. A cured or uncured composition consisting essentially of:
   I. a polymer which is
      A. an epihalohydrin homopolymer, or
      B. an epihalohydrin copolymer of:
         1. at least 5 mol% of an epihalohydrin monomer; and Table 2

|  | Example 10 | Example 11 | Example 12 | Example 13 | Example 14 | Example 15 | Example 16 |
|---|---|---|---|---|---|---|---|
| CHR | 100 | 100 | | | | | |
| CHO | | | 100 | 100 | 100 | 100 | 100 |
| Dioctyl tin stearate | 1.5 | 1.5 | 1.5 | 1.5 | 1.5 | 1.5 | 1.5 |
| carbon black | 40 | 40 | 40 | 40 | 40 | 40 | 40 |
| Red lead | | | 5 | 5 | 5 | 5 | 5 |
| Magnesia | 5 | | | | | | |
| Basic lead phosphite | | 5 | | | | | |
| Succinic anhydride | | 2 | 3 | 3 | | | |
| Tetrahydrophthalic anhydride | 2 | | | | 3 | 3 | 3 |
| DBU-guaiacol salt | 2 | | | | | | |
| DBU-carbonic acid salt | | | | | 3 | | |
| DBU-acetic acid salt | | 3 | | | | | |
| DBU-2-ethylhexanoic acid salt | | | | | | 3 | |
| DBU-p-hydroxybenzoic acid salt | | | | | | | 3 |
| DBU-fumaric acid salt | | | | 3 | | | |

Table 2'

| | (measured at 20° C) | | | | | | |
|---|---|---|---|---|---|---|---|
| | Example 10 | Example 11 | Example 12 | Example 13 | Example 14 | Example 15 | Example 16 |
| modulus at 100%(Kg/cm³) | 25 | 28 | 32 | 35 | 41 | 31 | 28 |
| modulus at 200%(Kg/cm³) | 36 | 55 | 70 | 73 | 80 | 71 | 66 |
| Tensile strength at break (Kg/cm³) | 101 | 112 | 120 | 138 | 121 | 133 | 135 |
| Elongation at break(%) | 940 | 780 | 550 | 520 | 410 | 580 | 590 |
| Hardness(Shore A) | 68 | 69 | 71 | 72 | 74 | 71 | 71 |

Next, an experiment was carried out for comparing the corrosive effects on molds when curing the uncured compositions obtained in Examples 2, 6 and 15 and Controls 5 and 6. The results obtained are shown in Table 3 below. The test was carried out using molds having a 10-micron-thick hard chromium plating. The uncured composition was placed in a mold and heat-molded under the curing conditions of 30 minutes at 160° C. and 80 Kg/cm². The molding was repeated, using on each occasion a fresh uncured composition. The molding was repeated in this manner until the for- 2. the remainder being at least one monomer selected from the group consisting of an epihalohydrin other than (1), copolymerizable epoxides other than epihalohydrin, and 5-membered dicarboxylic acid anhydrides; and
   II. a curing agent and acid acceptor consisting essentially of, on a basis of 100 parts by weight of polymer I:

A. from about 0.1 to about 100 parts by weight of a cyclic carboxylic acid anhydride;

B. from about 0.1 to about 10 parts by weight of a compound selected from the group consisting of 1,8-diazabicyclo (5,4,0) undecene-7 and salts thereof; and C. from about 0.5 to about 20 parts by weight of at least one metal compound selected from the group consisting of: the oxide, hydroxide, carbonate and carboxylic acid salt of a metal of Group II of the Periodic Table of elements; and the oxide, basic carbonate, basic carboxylic acid salt and basic phosphite of a metal of Group IV-A of the Periodic Table.

2. The composition of claim 1 in which polymer I is an epihalohydrin homopolymer selected from the group consisting of polyepichlorohydrin and polyepibromohydrin.

3. The composition of claim 1 in which polymer I is an epihalohydrin copolymer with component I(B)(1) being selected from the group consisting of epichlorohydrin and epibromohydrin.

4. The composition of claim 3 in which the epihalohydrin monomer of polymer I(B)(2) is selected from the group consisting of epichlorohydrin and epibromohydrin.

5. The composition of claim 3 in which the copolymerizable epoxide of polymer I(B)(2) is selected from the group consisting of ethylene oxide, propylene oxide, butylene oxide, styrene oxide, phenyl glycidyl ether and glycidyl methacrylate.

6. The composition of claim 3 in which the 5-membered dicarboxylic acid anhydride of polymer I(B)(2) is selected from the group consisting of succinic anhydride, phthalic anhydride, itaconic anhydride, hexahydrophthalic anhydride and tetrahydrophthalic anhydride.

7. The composition of claim 3 in which polymer I(B)(1) is at least 10 mol%.

8. The composition of claim 7 in which polymer I(B)(1) is at least 20 mol%.

9. The composition of claim 8 in which polymer I(B)(1) is at least 40 mol%.

10. The composition of claim 1 in which component II(A) is from about 0.5 to about 5 parts by weight.

11. The composition of claim 1 in which component II(B) is from about 0.5 to about 5 parts by weight.

12. The composition of claim 1 in which component II(C) is from about 1 to about 10 parts by weight.

13. The composition of claim 1 in which component II(A) is selected from the group consisting of succinic anhydride, maleic anhydride, citraconic anhydride, itaconic anhydride, tetrahydrophthalic anhydride, methyl tetrahydrophthalic anhydride, endomethylene tetrahydrophthalic anhydride, phthalic anhydride, hexahydrophthalic anhydride, trimellitic anhydride, pyromellitic anhydride and dodecenylsuccinic anhydride.

14. The composition of claim 1 in which component II(B) is the salt of 1,8-diazabicyclo(5,4,0)undecene-7 and a compound selected from the group consisting of phenol, cresol, guaiacol, chlorophenyl, nitrophenol, pyrogallol and bis-(4-hydroxy phenyl)-2-propane.

15. The composition of claim 1 in which component II(B) is the salt of 1,8-diazabicyclo(5,4,0)undecene-7 and a carboxylic acid containing at least one carboxyl group, the acid being selected from the group consisting of aliphatic carboxylic acids containing 2 to 22 carbons, alicyclic carboxylic acid containing 6 to 20 carbons, and aromatic carboxylic acids containing 7 to 20 carbons.

16. The composition of claim 1 in which component II(B) is the salt of 1,8-diazabicyclo(5,4,0)undecene-7 and a member of the group consisting of silicates, silica and hydrous silica.

17. The composition of claim 1 in which the metal of Group II of II(C) is selected from the group consisting of Mg, Ca, Zn, Sr, Cd and Ba.

18. The composition of claim 17 in which component II(C) is selected from the group consisting of magnesium oxide, calcium oxide, calcium hydroxide, barium oxide, zinc oxide, magnesium benzoate, calcium oleate, magnesium carbonate and calcium carbonate.

19. The composition of claim 1 in which the metal of Group IV-A of component II(C) is selected from the group consisting of Si, Be, Sn and Pb.

20. The composition of claim 19 in which component II(C) is selected from the group consisting of triplumbic tetroxide, lead monoxide, dibasic lead carbonate and dibasic lead phthalate.

21. The composition of claim 1 wherein component II(A) additionally contains from about 0.1 to about 5 parts by weight per 100 parts by weight of polymer I, at least one alkali metal salt of an acid selected from the group consisting of carboxylic acids containing at least two carboxyl groups, orthophosphoric acid, phosphonic acid and cyanuric acid.

22. The composition of claim 21 in which the alkali metal salt is selected from the group consisting of sodium succinate, potassium succinate, sodium adipate, potassium fumarate, potassium phthalate, sodium trimellitate, potassium sebacate, sodium citrate, potassium phosphate and potassium phosphonate.

23. The composition of claim 1 in which polymer I is a homopolymer consisting essentially of epichlorohydrin; Component II(A) is present in the amount of from 2 to 5 parts by weight and is selected from the group consisting of succinic anhydride, tetrahydrophthalic anhydride, and allyl chloride-maleic anhydride copolymer; Component II(B) is present in the amount of from 2 to 3 parts by weight and is selected from the group consisting of 1,8-diazabicyclo(5,4,0)-undecene-7 and the phenol and guaiacol salts thereof; and Component II(C) is present in the amount of from 1 to 5 parts by weight and is selected from the group consisting of dioctyl lead stearate, triplumbic tetroxide, magnesium oxide and basic lead phosphite, the parts by weight of Components II(A), (B) and (C) being based on 100 parts by weight of polymer I.

24. The composition of claim 23 which is cured by heating for 30 minutes at 155° C. and 80 kg/cm².

25. The composition of claim 1 in which polymer I(B) is a epihalohydrin copolymer consisting of
1. 50 mol% of epichlorohydrin, and
2. 50 mol% of ethylene oxide;

Component II(A) is present in the amount of from 2 to 5 parts by weight and is selected from the group consisting of succinic anhydride, tetrahydrophthalic anhydride, hexahydrophthalic anhydride, itaconic anhydride, dodecenyl succinic anhydride and pyromellitic anhydride; Component II(B) is present in the amount of 2 to 3 parts by weight and is selected from the group consisting of 1,8-diazabicyclo(5,4,0)undecene-7, and the phenol, carbonic acid, acetic acid, 2-ethylhexanoic acid, p-hydroxybenzoic acid and fumaric acid salts thereof; and Component II(C) is present in the amount of 1 to 5 parts by weight and is selected from the group consisting of dioctyl lead stearate, triplumbic tetroxide and dioctyl tin stearate, the parts by weight of Components II(A), (B) and (C) being based on 100 parts by weight of polymer I.

26. The composition of claim 25 which is cured by heating for 30 minutes at 155° C. and 80 kg/cm².

27. The composition of claim 1 additionally containing, per 100 parts by weight of polymer I, about 1 to 100 parts by weight of fillers, reinforcing agents, plasticizers or softeners; about 0.1 to 10 parts by weight of lubricants and tackifiers; and 0.1 to 10 parts by weight of antioxidants and stabilizers.

28. The cured composition of claim 1 additionally containing from about 0.1 to about 5 parts by weight per 100 parts by weight of polymer I, an agent for improving the heat-aging resistance thereof, the agent being selected from the group consisting of sodium succinate, potassium succinate, sodium trimellitate, potassium sebacate, sodium citrate, potassium phosphate, and potassium phosphonate.

* * * * *

UNITED STATES PATENT AND TRADEMARK OFFICE
CERTIFICATE OF CORRECTION

PATENT NO. : 4,069,174

DATED : January 17, 1978

INVENTOR(S) : Nakata, et al.

It is certified that error appears in the above-identified patent and that said Letters Patent are hereby corrected as shown below:

Claim 17, line 2, after "of", insert --component--

Claim 19, line 3, delete "Be", insert --Ge--

Claim 25, line 1, delete "(B)"

Signed and Sealed this

Twentieth Day of June 1978

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,069,174
DATED : January 17, 1978
INVENTOR(S) : NAKATA, ET AL.

It is certified that error appears in the above-identified patent and that said Letters Patent are hereby corrected as shown below:

Item 30, insert the following:

```
-- May  9, 1974    Japan .......... 49-52076
   May 23, 1974    Japan .......... 49-58580
   May 23, 1974    Japan .......... 49-58581
   Aug. 30, 1974   Japan .......... 49-100119 --
```

Signed and Sealed this

Fourteenth Day of November 1978

[SEAL]

Attest:

RUTH C. MASON
Attesting Officer

DONALD W. BANNER
Commissioner of Patents and Trademarks